(12) United States Patent
Mohrman

(10) Patent No.: US 6,282,731 B1
(45) Date of Patent: Sep. 4, 2001

(54) MULTIPLE VARIABLE FLUSH WATER STORAGE TANK TOILET

(76) Inventor: John Harry Mohrman, 301 Village Rd., Orwigsburg, PA (US) 17961

( * ) Notice: Subject to any disclaimer, the term of this patent is extended or adjusted under 35 U.S.C. 154(b) by 0 days.

(21) Appl. No.: 09/438,282

(22) Filed: Nov. 12, 1999

Related U.S. Application Data

(60) Provisional application No. 60/082,396, filed on Apr. 20, 1998.

(51) Int. Cl.[7] ............................................. E03D 1/14
(52) U.S. Cl. ........................... 4/326; 4/346; 4/405
(58) Field of Search ....................... 4/324, 325, 326, 4/327, 346, 405, 413, 414, 415

(56) References Cited

U.S. PATENT DOCUMENTS 5,003,644 * 4/1991 Huang ........................... 4/326 X
5,042,096 * 8/1991 Bolli ............................ 4/326
5,450,634 * 9/1995 Mohrman ...................... 4/326

* cited by examiner

Primary Examiner—Charles E. Phillips

(57) ABSTRACT

A multiple variable flush storage tank toilet has been developed as preferred state-of-the-art to improve the means of reducing the amount of water used in a water flush type toilet. The improved mechanism within the toilet storage tank relies on a partitioned smaller and larger compartmented space in accordance with that state-of-the-art. The variable means of flushing to obtain a multiplicity of smaller water flushes plus a larger water flush has been obtained by use of "V"-indented polygons. The mechanism for flushing is operated by using a conventional exterior tank handle and is adaptable for a variety of polygons. All functions of the mechanism are simplified beyond that of the current conventional toilet. The variety o flushings are duplicated as use of the toilet is continued.

7 Claims, 3 Drawing Sheets

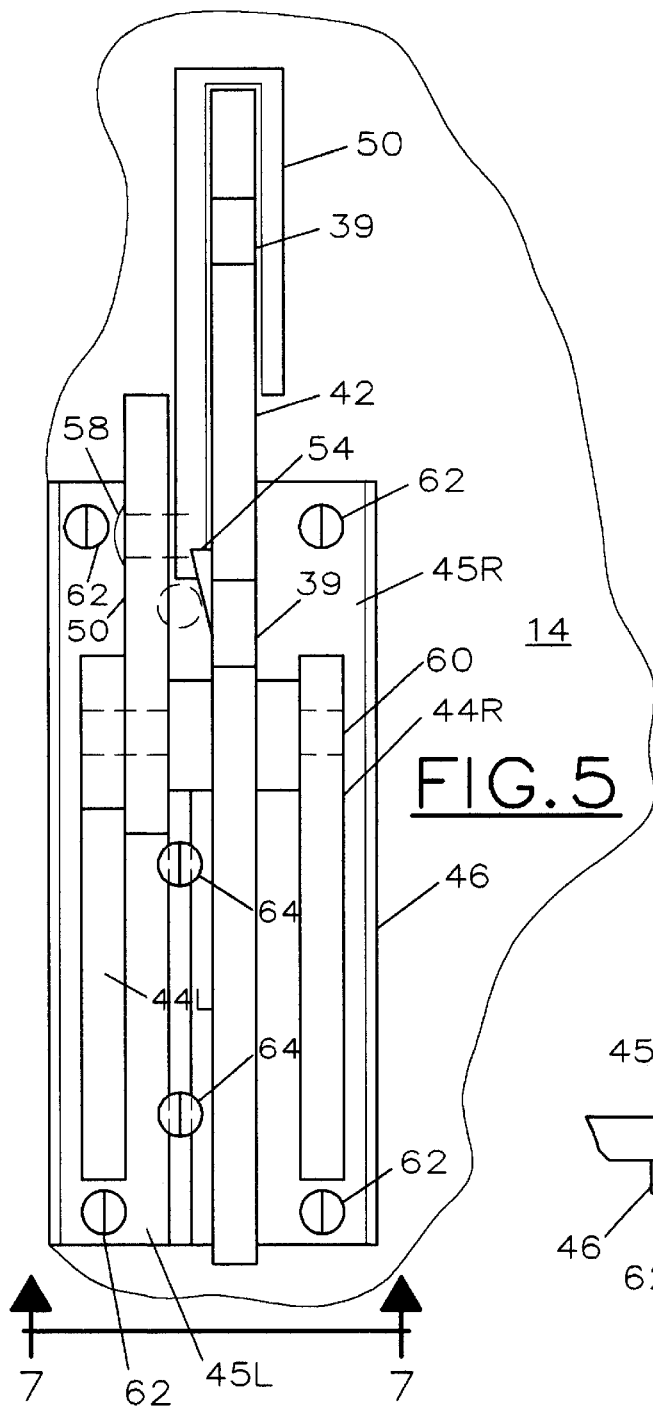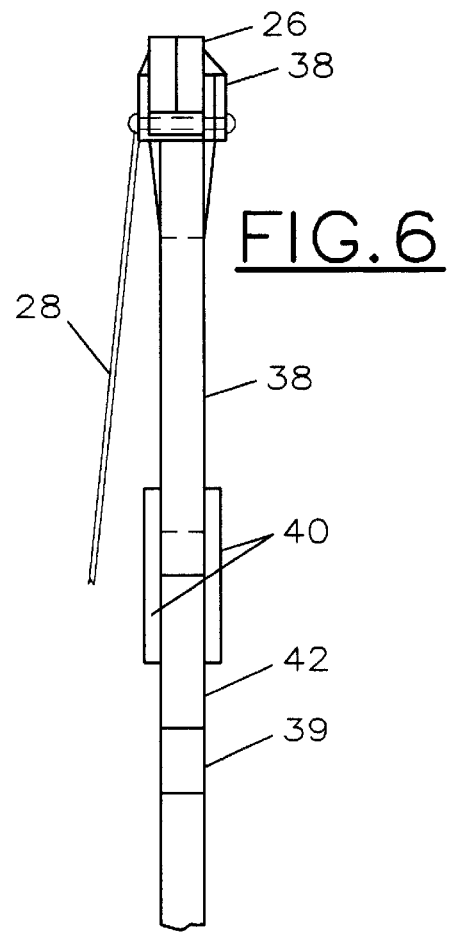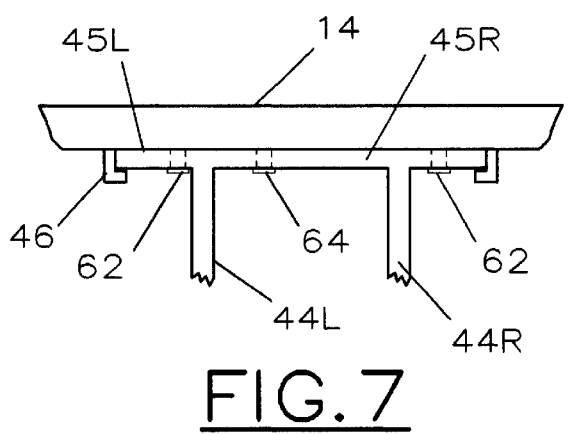

MULTIPLE VARIABLE FLUSH WATER STORAGE TANK TOILET

CROSS-REFERENCE TO RELATED APPLICATIONS

U.S. Pat. No. 5,450,634, dated Sep. 19, 1995. This is a continuation of my provisional patent application of Apr. 20, 1998, accorded Ser. No. 60/082,396.

BACKGROUND OF THE INVENTION

This invention relates to the efficient use of the water in the holding tank of the water-flush toilet that causes human wastes to flow into sewers, septic tanks, or other sewage treatment systems.

Past efforts have been made to develop a toilet equipped with a water storage tank adapted to use less water while flushing waste away efficiently. Manual pressure on the standard flush lever could not be exerted effectively by all users because of the standing water head of weight on the outlet valve. The holding tank holding the water needed to flush the toilet was made smaller and smaller, and also the tank was compartmented in an effort to reduce the amount of water being used per flush. In the case of the capacity being made smaller, the amount of water being used to flush the toilet was becoming marginally inadequate to flush waste efficiently. In the instance of the tank being dually compartmented, the concept was sound; however, the mechanisms needed for causing such compartments to flush proved too complicated and costly for common use. Although the employment of companion small and large compartments was functional, such a configuration of the flushing mechanism, the toilet bowl and the traps, did not prove to be feasible. It is known that some enlargement of the trap within the current toilet bowl has been developed by certain manufacturers, making it possible for the trap to hold more waste.

SUMMARY OF THE INVENTION

The purpose of the invention is to improve and simplify a method of activating the flushing of a water holding tank that has been divided into small and a large compartments, and to reduce the amount of manual pressure that must be exerted on the standard exterior flush handle needed to activate stored water to leave the holding tank and to flush the toilet bowl. The present invention comprises a mechanism that is extremely efficient and simple to operate. The invention allows for selection of one of several of a variety of planar, polygon-shaped impellers such as the pentagons, hexagons, and octagons, as impellers, each provided of a plurality of spaced-apart, peripheral "V" shaped notches, to vary the frequency of sequential flushing events from the small compartment, in a direct ratio to flushing of the large compartment. Selection of a particular polygonal edge, configuration impeller would be dependent upon the ease in which waste, consisting of liquids, solids, and toilet tissue, would flow from the toilet bowl into and through the sewer line, at a particular installation, and is within the skill of the art.

In a preferred embodiment of the invention, there is provided, a modified gravity water-flush toilet tank, now divided into a larger and smaller volume compartment. Each compartment contains its own discrete water-fill means, flush outlet valves, and linkage means operatively connected between a manually-powered flushing lever and the two flush outlet valves. Each linkage means is preadjusted to allow the flush outlet valve in the smaller compartment to open partially, before the flush outlet valve in the larger compartment is opened. As the toilet is manually flushed, the standard flush rod is lifted and normally would open the large compartment flush outlet valve. By addition, of an extension arm axially to the standard flush rod, the upward movement of both the standard length and added extension rod are limited by a counterbalanced, two-part limit lever. That limit lever comprises a lower swiveling component attached to the polygon axle and an upper movable component attached to that swiveling member, so that on initial flushing only the small compartment flush outlet valve is opened. As the upward arc of the flush rod extension occurs with flush lever rotation, a counter balanced, hook-shaped end lever, attached to the flush rod extension, engages one of the "V's"-shaped openings in the particular polygon impeller. This causes the polygon impeller to rotate one finite length arc in a counter clockwise direction, the small compartment flush outlet valve is then opened, and the water in that compartment of the tank flushes the toilet bowl. As the smaller compartment becomes devoid of water, its flush outlet valve begins closing by gravitational means, causing the flexible linkage between the toilet outlet valve and the flush rod extension to move downward. The flush rod extension arm then lowers onto the polygon, and causes the polygon impeller to partially rotate in a counter clockwise direction, so that one of the linear edges of the polygon impeller, and the bottom of the flush rod extension, are on the same plane. After a number of water flushes from the smaller compartment occur in the same sequence, the impeller rotates to a point where a single lateral lug provided on the impeller surface comes in contact with a stop pin attached to the movable part of the counterbalanced limit lever. That is caused to move in the "L's"-shaped slot provided in the lower part of the counterbalanced limit lever. As the impeller is forced to rotate in a finite arc, the single lug forces that stop pin to move into the vertical part of the "L's"-shaped slot, thereby allowing the movable part of the counterbalanced limit lever to extend upward. That action causes the flush rod extension arm and the standard flush rod to move to their highest point. As a result of that action, dual linkage opens the flush outlet valves in both compartments and that the entire tank is allowed to flush the bowl. When all water leaves each of the compartments of the water holding tank, both of the flush outlet valves close by gravity. Sequentially, thereby drawing the flush rod and extension downwardly, and allowing that stop pin of the movable part of the counterbalanced limit lever to move downwardly and reseat in the lower original horizontal position of the "L's"-shaped slot. The entire sequence is repeatable.

BRIEF DESCRIPTION OF THE SEVERAL VIEWS OF THE DRAWING

FIG. 5 is a broken out, enlarged, vertical sectional view of the flushing mechanism, its adjustable support base, and the support arms for the impeller shaft, and also the two-component, counterbalanced, limit lever with a stop pin, taken along line 5—5 of FIG. 3;

FIG. 6 is a broken out, enlarged end elevation view of components of FIGS. 3 & 4 of the counter balanced hooked lever assembly attached to the flushing rod extension, taken along line 6—6 of FIG. 3;

FIG. 7 is a broken out, enlarged sectional view looking upward, taken along line 7—7 of FIG. 5.

DETAILED DESCRIPTION OF THE INVENTION

Figure 1:
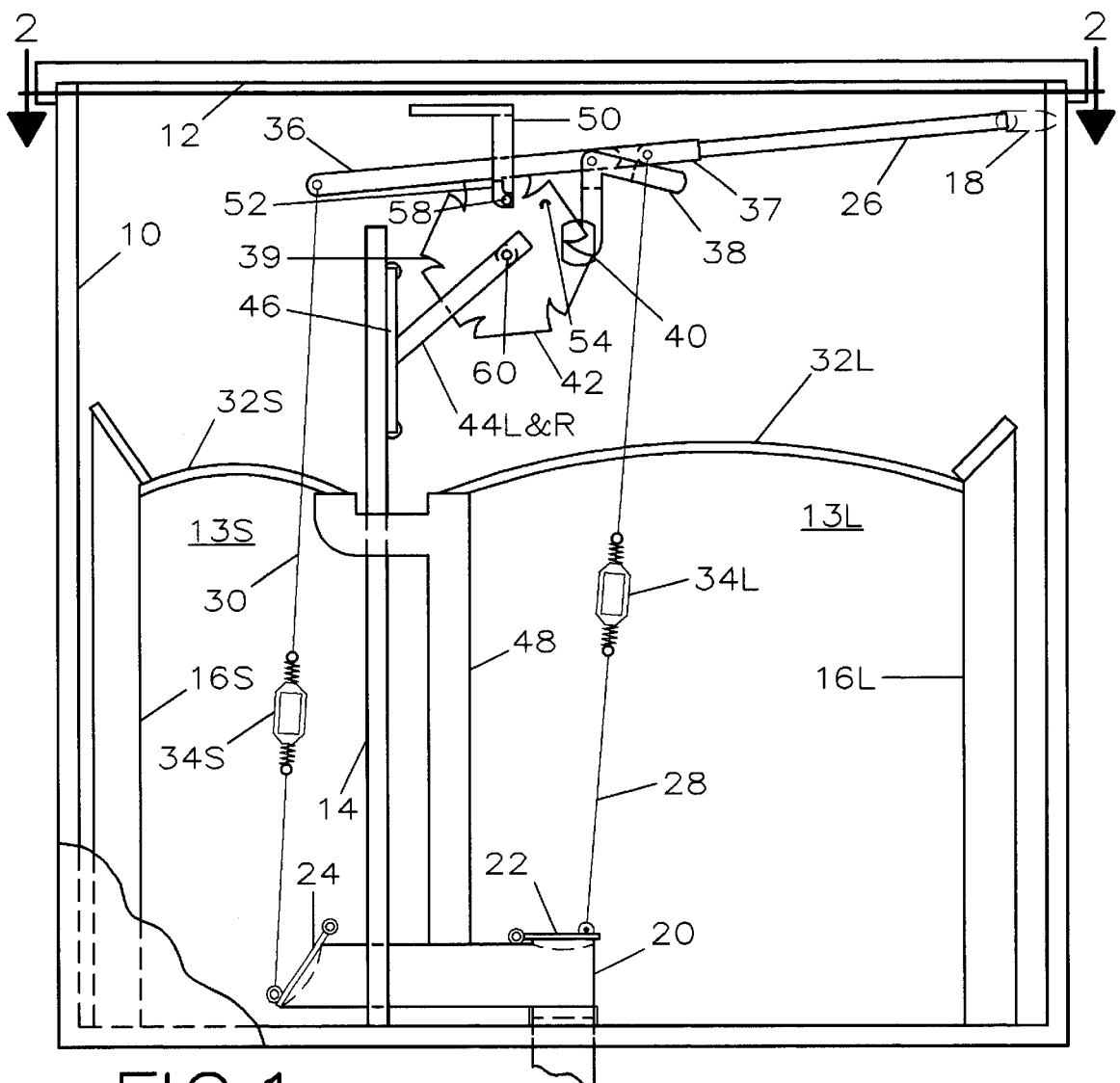
FIG. 1 is a schematic rear wall, vertical section view of a toilet tank showing the differential volume dual water compartments and their flushing mechanism linkages to the flush outlet valves.
Figure 2:
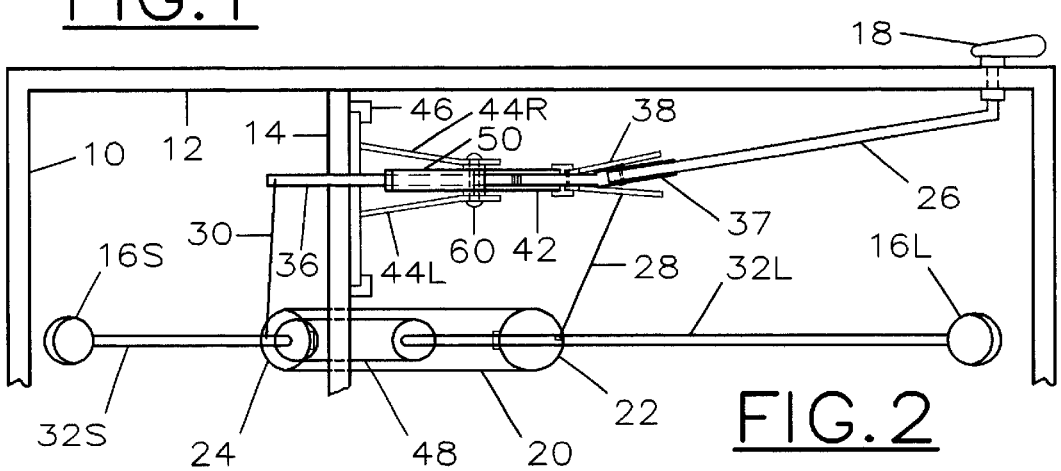
FIG. 2 is a schematic, top sectional view of the toilet tank showing the dual compartments and flushing mechanism adjustable length linkages, taken along line 2—2 of FIG. 1.
Figure 3:
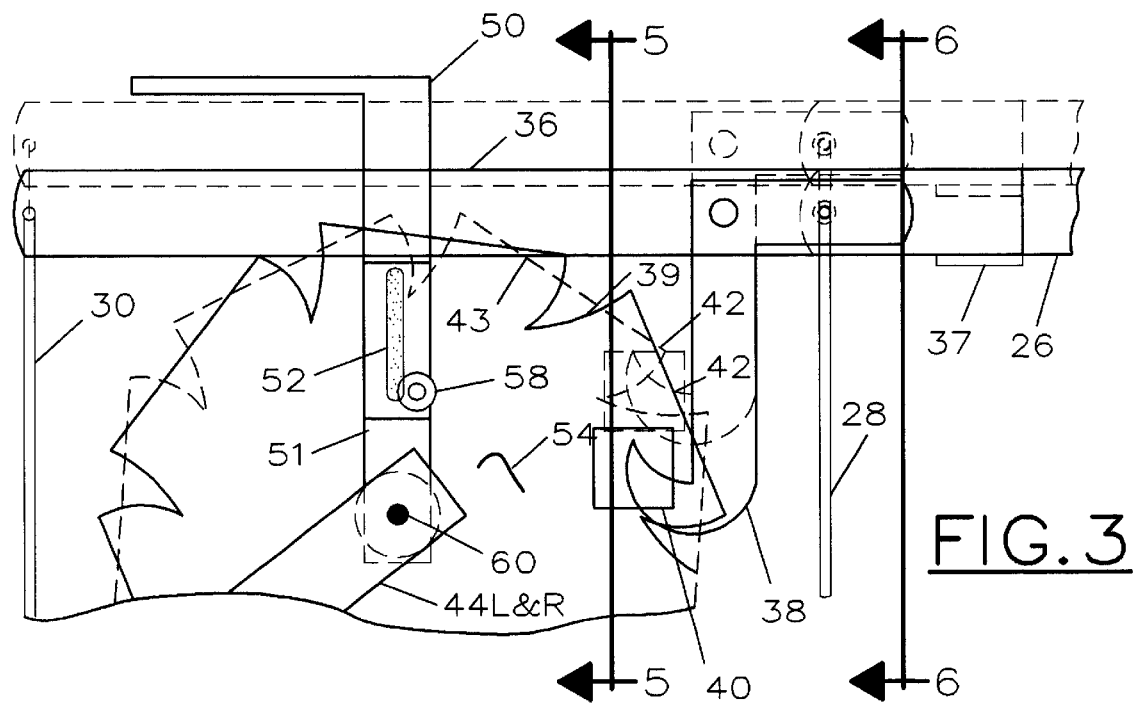
FIG. 3 is a broken out, more detailed and enlarged, partial rear wall view of all of the flushing mechanism components, illustrating the position of certain components, with both flush outlet valves closed (FIG. 1); and by phantom lines, the position of all linkage components, when only the flush outlet valve for the smaller compartment is opened.
Figure 4:
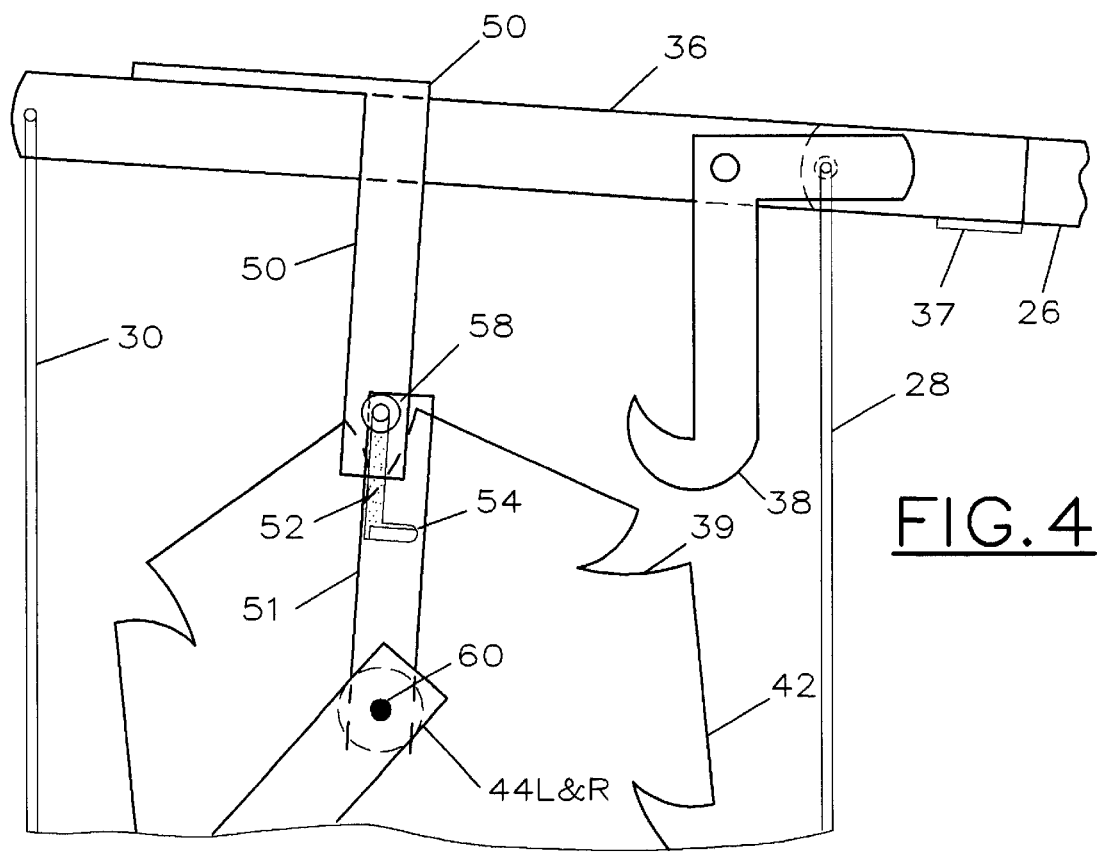
FIG. 4 is a broken out, more enlarged, partial rear wall view of the components of FIG. 3, now illustrating the position of certain components, as the protruding lug on the polygonal-sided, impeller forces the stop pin, of the movable part of the counter balanced limit lever, to be extended upward extensively, allowing both flush outlet valves to be opened at the same time.

The functional components of the variable volume flush water storage tank toilet are depicted in FIGS. 1–7. In the rear wall view of FIG. 1 the toilet tank is shown as 10, the displaceable tank lid as 12, the partition wall 14 dividing the smaller and larger compartments as 13S & 13L, the standard water control regulating means as 16S & 16L, and an exterior lever handle 18 that is manually depressed to flush the standard toilet. The common flush outlet pipe 20 is equipped with flush outlet valve 22, for the larger compartment 13L and valve 24 for the smaller compartment 13S. An interim detently dispersed turnbuckle 34L of adjustable cable 28 connected to valve 22, is for the larger compartment, while the interim detently dispersed turnbuckle 34S adjusts cable 30 connected to valve 24 of the smaller compartment. Each of cables 28 and 30 are tied at the other longitudinal ends to rods 26 and 36, respectively. Overflow conduits, 32S and 32L, run from each water control level regulating means, 16S and 16L, and to the common upstanding overflow pipe 48 lower end, is functionally connected to outlet pipe 20. The adjustable turnbuckles, 34S & 34L, on cables 28 and 30 for both compartments, are operatively connected to control rod 26, which rod 26 is also attached at one longitudinal end to handle 18, and the opposing end of flush rod extension 36, at the other longitudinal end. As the handle 18 is depressed, flush rod 26 rises pivotally, and because of a closed cross-sectional detent portion 37 of connected flush rod 36, the extension flush rod 36 is moved in alignment with flush rod 26, thereby lifting cable linkage 30 to open flush outlet valve 24 so as to empty the smaller compartment 13S. As flush rod 26 and its integral rod extension 36 are both raised, the counter balanced, "L"-shaped lever 38, peripherally hooked at one end, engages in one of the "V" notches or spaced apart recesses defining arrow-like points 39 on impeller or polygonal plate 42, which turns the impeller one arcuate length in a counter clockwise direction on common axis 60. The impeller 42 thereby effects a mechanical advantage in raising the flush rod extension 36 only, while counterbalanced hooked lever 38 continues to remain engaged with the periphery of impeller 42. As outer rod 36 travels upwardly, it is arrested by counterbalanced detent component 50 and its associated component 51, the latter being pivotally anchored on axis 60. Smaller compartment 13S is now devoid of water, so flush outlet valve 24 exerts a gravitational bias on linkage 30, exerting a downward force on outer rod extension 36, causing that rod to lower onto the periphery of impeller 42, thereby rotating same somewhat further, counterclockwise, until a linear segment 43 of impeller 42 coincides with the planar undersurface of extension rod 36 (FIG. 3). As a continuing rotation of impeller 42 takes place, the counterbalanced, hooked-end lever 38 disengages from impeller 42. FIG. 3 depicts the above described mechanisms by solid lines, when smaller compartment 13S outlet valve 24 is in the closed position (FIG. 1). By the phantom lines, it depicts the alternate position of the mechanism, when the same outlet valve 24 is open (not seen). FIG. 4 illustrates the lug-like protrusion 54 located on the outward planar surface of impeller 42. As impeller 42 rotates to the point that stop pin 58 mounted upon detent lever 50, has been forced horizontally and upwardly into the recess of "L"-shaped slot 52 on detent lever 51, thereby allowing counterbalanced, detent lever 50 in communication with detent lever 51, attached to common axis 60, to extend upward to its maximum height. This allows rods 36 and 26 acting through cables 28 and 30, to open both of flush outlet valves 22 and 24, which causes the entire tank to become devoid of water.

FIG. 5, taken along lines 5—5 of the FIG. 3, shows the base-mounted, support members, 44L & 44R, attached to the movable, two-component base 45L and 45R, which are held in place by screws 64. The base 45L and 45R is also fixed in a vertical position by set screws 62 affixed on the dividing partition 14 sidewall. Support members, 44L & 44R, and the two-segment, movable base, 45L & 45R, can be moved vertically within the "L"-shaped retaining, elongate slots 46, provided in vertical partition wall 14. The two-segment, movable base, 45L & 45R, can be readily disassembled to allow installation of a variety of sided polygon impellers like 42.

FIG. 6, taken along lines 6—6 of FIG. 3, illustrates an end elevation view of the counterbalanced hooked-end lever 38, showing the standard flush control rod 26, along with proximal cable linkage 28, and impeller 42, and one "V"-notch 39 therein. Planar members 40, fastened to the counterbalanced hooked lever 38, guides that lever to engage the "V"-notches on impeller 42. Planar members 40. serves to maintain lever 38, in alignment with the vertical plane of rotational travel of impeller 42.

FIG. 7 illustrates the two-component base 45L & 45R, taken along line 7—7 of FIG. 5, which base can be adjusted vertically in the "L"-shaped elongate retaining slots 46, mounted integrally on the divider partition 14, and held in place by their set screws 62.

I claim:

1. In a water flush waste disposal system that comprises a gravity flow, water-flush capability drawn from a refillable water holding tank, and equipped with a water/waste collection bowl and bowl trap, having a first conduit means to pass finite amounts of water from the tank to the bowl, a second conduit means for passing water-diluted waste from the bowl trap to the sewage system, and a first valving means for passing diluted waste from said bowl to interim storage within the bowl trap, and having a second valving means to clear trapped waste from said bowl trap, the system further being adapted for variable water volume dispensing from the holding tank, the improvement comprising:

(a) a water holding tank provided with an internal vertical partition wall dividing the holding tank into a larger first liquid storage compartment and a second, but substantially smaller, liquid storage compartment;

(b) a waste trap zone disposed below the bowl in said second conduit and in fluid communication with said bowl adapted for retaining diluted waste materials passing to it from each valving means from water flow from the said smaller compartment;

(c) a vertical-aligned, polygonal plate having an axial bore hole, and mounted within a top section of said holding tank being adapted to rotate axially in incremental steps, with each step being associated with the release of liquid held in said smaller tank compartment, said plate also being provided along the periphery with a plurality of spaced-apart recesses, defining arrow-like point recesses, all points being oriented to point in one tangential direction on the plate;

(d) an external knob mounted on the outer surface of the holding tank, and being adapted to operatively interact with said polygonal plate and to shift said plate rotationally upon each activation of the external knob;

(e) a flush controlled linear member serving as the mechanism to translate knob actuation to the rotatable plate, which member has a first proximal rigid segment and a pivotally attached second distal rigid segment;

(f) a first linking means operatively interconnected between a point on the second segment and the first valving means which is provided proximal to the bottom section of said first compartment, whereby a rotational step move of said plate opens said first smaller compartment to said bowl permitting liquid flow therefrom;

(g) a second linking means operatively interconnected between a point on the first segment and a second valving means cover which is provided proximal to the bottom section of said second compartment, whereby a rotational shift of said plate opens said larger compartment to said bowl permitting water liquid flow therefrom;

(h) a pair of spaced apart, upstanding support members adapted to receive at their upper longitudinal ends, a horizontally oriented support pin, which pin engages the axial bore of said polygonal plate;

(i) a first L-shaped lever member pivotally pinned to a point intermediate the longitudinal ends of the first proximal segment of the control member and having its distal longitudinal end adapted to tangentially engage sequentially with the plurality of recesses arrayed on the plate periphery, and then to disconnect;

(j) a second L-shaped member pivotally pinned coincident with the axis of the polygonal plate, and adapted to limit the upward travel of the second distal segment of the linear member when it starts to activate the anchored second linking means which serves to void the second water storage compartment.

2. The flushing system according to claim 1 wherein the liquid volume ratio of the larger water storage compartment to the smaller compartment is about 6:1.

3. The system of claim 1 wherein the number of planar side edges provided in the polygonal plate will determine the ratio of sequential liquid flushes from the smaller compartment occurring prior to concurrent liquid voiding from the larger compartment.

4. The system of claim 1 wherein the flush control member is adapted so that the first segment and a second segment move coincidentally when activated by the external knob, and in the upward direction and is further adapted to move independently when both segments thereof are gravitationally biased to move in the downward direction.

5. The system of claim 1 wherein both of the first and second linkage means between the flush control member and the respective first and second valving means can be varied in length to permit sequential openings of the first valving means until said plate rotates to a position wherein a lug-like protrusion provided on one planar surface of the plate activates a release mechanism that permits a detent member to shift upwardly beyond the inclination of the first segment, thus permitting both of the valving means to void the first and second compartments coincidentally.

6. The flush system of claim 1 wherein the plate is mounted rotatably upon a pair of spaced-apart, upstanding support arms that are vertically adjustable within the tank.

7. The system of claim of 6 wherein the upstanding pair of support arms are mounted at their lower longitudinal ends upon an underlying base plate, which base plate is vertically shiftable along one side wall of the partition wall, upon which the base plate is anchored.

\* \* \* \* \*